(12) United States Patent
Briggs et al.

(10) Patent No.: US 8,977,296 B1
(45) Date of Patent: Mar. 10, 2015

(54) METHODS AND SYSTEMS FOR SETTING UP GEO FENCES AND DELIVERING DIGITAL MEDIA CONTENT BASED ON SUCH GEO FENCES

(75) Inventors: Bernard Briggs, Austin, TX (US); Ben Gaddis, Austin, TX (US); Anthony Nguyen, Austin, TX (US)

(73) Assignee: T3 Innovation Labs, LLC, Austin, TX (US)

( * ) Notice: Subject to any disclaimer, the term of this patent is extended or adjusted under 35 U.S.C. 154(b) by 16 days.

(21) Appl. No.: 13/365,129

(22) Filed: Feb. 2, 2012

(51) Int. Cl.
*H04W 24/00* (2009.01)

(52) U.S. Cl.
USPC .................................... 455/456.3; 455/456.1

(58) Field of Classification Search
CPC .. H04W 4/02; H04W 64/00; H04L 29/08657; G06Q 30/0261
USPC .......... 455/456.1, 456.2, 456.3, 404.2, 456.5, 455/456.6
See application file for complete search history.

(56) References Cited

U.S. PATENT DOCUMENTS

| | | | |
|---|---|---|---|
| 7,116,992 B1* | 10/2006 | Tsunehara et al. | 455/456.6 |
| 7,305,397 B2* | 12/2007 | Spencer, Jr. | 1/1 |
| 2002/0143462 A1* | 10/2002 | Warren | 701/200 |
| 2003/0187821 A1* | 10/2003 | Cotton et al. | 707/1 |
| 2007/0176771 A1* | 8/2007 | Doyle | 340/539.13 |
| 2009/0125814 A1* | 5/2009 | Willcock | 715/738 |
| 2009/0175213 A1* | 7/2009 | Gu et al. | 370/312 |
| 2010/0020752 A1* | 1/2010 | Anschutz et al. | 370/328 |
| 2011/0287786 A1* | 11/2011 | Cassapakis | 455/456.3 |
| 2012/0130796 A1* | 5/2012 | Busch | 705/14.36 |
| 2012/0225672 A1* | 9/2012 | Tholkes et al. | 455/456.3 |
| 2013/0339345 A1* | 12/2013 | Soto Matamala et al. | 707/722 |

* cited by examiner

*Primary Examiner* — Magdi Elhag
(74) *Attorney, Agent, or Firm* — Carr & Ferrell LLP (57) ABSTRACT

Provided are methods and systems for setting up geo fences and dynamically delivering particular digital media content based on these geo fences. A method may involve providing information corresponding to a specific geographic location and identifying a virtual geographical boundary around that location, for example, by adjusting position of the sliding bar. An interactive map may be used to illustrate location and boundary of the created geo fence and to specify some characteristics of that geo fence right on the map. Multiple common geo fences may be simultaneously created for different locations. Each geo fence may be associated with a token, which is incorporated into each subset of digital media content. Such tokens allow selecting and sending a particular subset to a subscriber device when the device enters a geographic area associated with a certain geo fence. Therefore, a subscriber device receives dynamically updated information based on its location.

17 Claims, 10 Drawing Sheets

Home  Campaigns  Fences  App  Analytics              Logout

Welcome back, John
Filler copy here and here and over to here and maybe right here too

| Campaigns  go to campaigns > | |
|---|---|
| Active | 12 |
| Inactive | 4 |
| Expired | 53 |

| Fences  go to fences > | |
|---|---|
| Active | 122 |
| Inactive | 65 |
| Created | 187 |

| Apps  go to apps > | |
|---|---|
| Active | 3 |
| Inactive | 0 |
| Registered | 3 |

Add Widgets

T3 Innovations Labs Blog  ⊗

Interesting Blog Title  04.02.11
Lorem ipsum dolor sit amet, consectetur adipiscing elit. Etiam feugiat gravida massa ac volutpat. Praesent egestas egestas ornare...
Read more >

Another Blog Title  04.01.11
Lorem ipsum dolor sit amet, consectetur adipiscing elit. Etiam feugiat gravida massa ac volutpat. Praesent egestas egestas ornare...
Read more >

One More Blog Title  03.28.11
Lorem ipsum dolor sit amet, consectetur

Your Social Buzz  ⚙ ⊗

Twitter Handle
Lorem ipsum dolor sit amet, consectetur adipiscing elit. Etiam feugiat gravida massa ac volutpat. Praesent egestas egestas ornare...
1 minute ago via web Twitter Handle
Lorem ipsum dolor sit amet, consectetur adipiscing elit. Etiam feugiat gravida massa ac volutpat. Praesent egestas egestas ornare...
10 minutes ago via HootSuite Twitter Handle
Lorem ipsum dolor sit amet, consectetur

Perimeter Case Studies  ⊗

Case Study Title  04.04.11
Lorem ipsum dolor sit amet, consectetur adipiscing elit. Etiam feugiat gravida massa ac volutpat. Praesent egestas egestas ornare...
Read more >

Case Study Title  03.28.11
Lorem ipsum dolor sit amet, consectetur adipiscing elit. Etiam feugiat gravida massa ac volutpat. Praesent egestas egestas ornare...
Read more >

Case Study Title  03.26.11
Lorem ipsum dolor sit amet, consectetur

METHODS AND SYSTEMS FOR SETTING UP GEO FENCES AND DELIVERING DIGITAL MEDIA CONTENT BASED ON SUCH GEO FENCES

FIELD OF THE INVENTION

This disclosure relates generally to geo fences and, more particularly, to methods and systems for setting up geo fences and delivering digital media content based on such geo fences.

DESCRIPTION OF RELATED ART

Location tracking is a useful mechanism that has been adopted for various uses, such as determining user's current location and identifying paths from that location to a new location, as well as identifying nearby points of interests. One example of a location tracking system is a Global Positioning System (GPS), which is known for its application of tracking vehicle locations and other similar uses. Other examples include triangulation using cellular telephone signals and radio frequency identification (RFID) systems for short-range location tracking.

Geo fencing was initially developed for tracking assets within a defined geographic region known as a "geo fence." A geo fence can be defined by reference to a perimeter, or boundary, surrounding a geographic area. The geographic area can be substantially circular or can be a polygon or any other shape. In such asset tracking systems, an asset is equipped with a sensor that provides a signal to a communication link. The system has a predetermined geo fence for each asset. When the communication link detects the sensor sending its signal from outside of the assigned geo fence, it alerts the asset owner and proper actions are taken to recover the assets. However, few other applications of the geo fencing concept have been developed because of complexities of setting up geo fences and monitoring the presence and absence of objects within geo fences.

SUMMARY OF THE CLAIMED INVENTION

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are methods and systems for setting up geo fences and dynamically delivering particular digital media content based on these geo fences. A method may involve providing information corresponding to a specific geographic location and identifying a virtual geographical boundary around that location (for example, by adjusting the position of a sliding bar). An interactive map may be used to illustrate a location and boundary of the created geo fence and to specify some characteristics of that geo fence right on the map. Multiple common geo fences may be simultaneously created for different locations. Each geo fence may be associated with a token, which is incorporated into each subset of digital media content. Such tokens allow for selecting and sending a particular subset to a subscriber device when the device enters a geographic area associated with a certain geo fence. Therefore, a subscriber device receives dynamically updated information based on its location.

In certain embodiments, a computer-implemented method for delivering digital media content to a subscriber device involves receiving geographic location information from the subscriber device corresponding to a current geographic location of the subscriber device. Based on the geographic location information, the current geographic location of the subscriber device with respect to one or more geo fences may be determined. The method may then proceed with selecting a subset of the digital media content based on the current geographic location of the subscriber device with respect to the one or more geo fences and sending the selected subset of the digital media content to the subscriber device for displaying on a subscriber interface of the subscriber devices. Examples of the digital media content include a webpage, a digital photo, an image, a text, an audio, and a video. Examples of the subscriber device include a portable computer, a cellular phone, and a personal digital assistant (PDA).

In certain embodiments, the method also involves repeating one or more operations described above. Specifically, the method may involve receiving new geographic location information from the subscriber device corresponding to a new current geographic location of the subscriber device. Based on this new geographic location information, the new current geographic location of the subscriber device may be compared to the one or more geo fences associated with the digital media content. Thereafter, a new subset of the digital media content may be selected based on the new current geographic location of the subscriber device with respect to the one or more geo fences. The method may then proceed the sending the newly selected subset of the digital media content to the subscriber device for displaying on a subscriber interface of the subscriber device. In certain embodiments, the new current geographic location falls within a different geo fence than the previous geographic location, and, as a result, the new subset of the digital media content is different from the original subset of the digital media content.

One or more geo fences may be associated with a predetermined location. In some of these examples, the subset of the digital media content may be selected to encourage a user of the subscriber device to move towards the predetermined location. For example, the predetermined location may correspond to a retail point, and digital media content may include various promotions encouraging the user to go to that retail point. The promotions may vary depending on the distance of the subscriber device from the retail point. In certain embodiments, a predetermined location corresponds to multiple geo fences. These multiple geo fences may be arranged into a nested format, overlap, or represent separate areas on the map. In the same or other locations, one or more geo fences correspond to multiple predetermined locations. For example, a common geo fence may be constructed for multiple retail points.

Receiving the geographic location information may be repeated based one or more factors. Some examples of these factors include current geographic location of the subscriber device with respect to a nearest available geo fence, a speed of changing the current geographic location of the device, and a direction of changing the current geographic location with respect to the nearest available geo fence. Therefore, instead of having predetermined update periods, which may be unnecessarily frequent in some situations and unnecessarily drain the battery of the subscriber device, or not frequent enough in other situations, with the frequency of such updates being determined dynamically.

In certain embodiments, a subset of digital media content is selected based on one or more preference settings associated with the subscriber device. For example, a user may rank various retail outlets, indicate a desired location, and ignore other locations. In the same or other embodiments, the publisher may analyze moving and transaction patterns of the user and make recommendations based on these patterns in addition or instead of the current location of the subscriber device. In certain embodiments, one or more geo fences may be mobile and associated with a mobile object. For example, a geo fence may be associated with a moving food truck or a delivery vehicle. When it is determined, based on such mobile geo maps, that a user is within these moving points, a specific subset of content is sent (e.g., an update about the delivered package located on the truck).

In certain embodiments, the method also involves an analytic component that allows a publisher to monitor and analyze its publishing campaigns. Specifically, the method may involve collecting geographic location information from multiple subscriber devices over a predetermined period of time. The collected geographic location information from the multiple subscriber devices may then be associated with the one or more geo fences. The method may then proceed with presenting statistical data numbers corresponding to a number of times the multiple subscriber devices enter each one of the one or more geo fences during the predetermined period of time.

In certain embodiments, the method may be used to trigger or otherwise activate various information devices, such as a display, an interactive billboard, and an interactive sign. For example, based on determining the current geographic location of the subscriber device with respect to the one or more geo fences, a trigger may be sent to an information device positioned in a predetermined location associated with the one or more geo fences. In one example, a user may approach an information device. Its proximity may be determined based on geo fencing techniques described elsewhere in this document. The information device may then be activated to greet the user or direct the user to further location similar to the subscriber interface of the subscriber device.

In certain embodiments, each geo fence is associated with a corresponding subset of the digital media content based on a public key, also referred to as a public token, specific to this geo fence. The public key may be embedded in the corresponding subset of the digital media content. In other embodiments, multiple geo fences may share the same key. For example, common geo fences may be created for multiple retail locations of the same chain and be a part of the same marketing campaign.

Provided also is a system for delivering digital media content to a subscriber device. The system may include at least one subsystem configured to receive geographic location information from the subscriber device corresponding to a current geographic location of the subscriber device. The same or another subsystem may be configured to determine the current geographic location of the subscriber device with respect to one or more geo fences based on the geographic location information. A subsystem may be configured to select a subset of the digital media content based the current geographic location of the subscriber device with respect to the one or more geo fences. The same or another subsystem may be configured to send the selected subset of the digital media content to the digital media to the subscriber device for displaying on a subscriber interface of the subscriber device. The system may also include a memory coupled to the at least one subsystem, with the memory comprising computer codes for the at least one subsystem.

Provided is a computer-readable medium having instructions stored thereon, which when executed by one or more computers, cause the one or more computers to receive geographic location information from the subscriber device corresponding to a current geographic location of the subscriber device. The same set of instructions may cause the computers to determine the current geographic location of the subscriber device with respect to one or more geo fences associated with the digital media content, based on the geographic location information. These instructions may also cause a selection of a subset of the digital media content based the current geographic location of the subscriber device with respect to the one or more geo fences. Finally, the instructions may also cause sending the selected subset of the digital media content to the digital media to the subscriber device for displaying on a subscriber interface of the subscriber device.

Provided also is a computer-implemented method for setting up one or more geo fences and associating digital media content with the one or more geo fences. The method may involve providing geographical information corresponding to a specific geographic location. It may also involve identifying a virtual geographical boundary around the specific geographic location to establish a geo fence associated with the specific geographic location. Other operations may include associating the geo fence or an app with a public token corresponding to a subset of the digital media content and incorporating the public token into the subset of the digital media content. In certain embodiments, a computer-implemented method involves identifying additional virtual geographical boundaries around the specific geographic location to establish an additional geo fence associated with the specific geographic location. The additional virtual geographical boundaries fall within the virtual geographical boundaries. In certain embodiments, identifying the virtual geographical boundaries around the specific geographic location may involve identifying a radius using a sliding ruler interface.

Provided also is a system for aggregating and sharing digital media content via a network that includes at least one processor configured to provide geographical information corresponding to a specific geographic location. The same or another processor may be configured to identify a virtual geographical boundary around the specific geographic location to establish a geo fence associated with the specific geographic location and may be configured to associate the geo fence or an app with a public token corresponding to a subset of the digital media content. In the same or other embodiments, at least one processor is configured to incorporate the public token into the subset of the digital media content. A memory may be coupled to the at least one of these processors and include codes for the at least one processor.

Finally, provided is a computer-readable medium having instructions stored thereon, which when executed by one or more computers, cause the one or more computers to provide geographical information corresponding to a specific geographic location. The instructions may also cause the computers to identify a virtual geographical boundary around the specific geographic location to establish a geo fence associated with the specific geographic location, to associate the geo fence or an app with a public token corresponding to a subset of the digital media content, and to incorporate the public token into the subset of the digital media content.

In further exemplary embodiments, modules, subsystems, or devices can be adapted to perform the recited steps. Other features and exemplary embodiments are described below.

BRIEF DESCRIPTION OF THE DRAWINGS

Embodiments are illustrated by way of example and not limitation in the figures of the accompanying drawings, in which like references indicate similar elements and in which:

FIGS. 6-9 show various examples of the publisher interface during different stages of setting up geo fences and updating their parameters.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The embodiments described herein relate to methods and systems for setting up geo fences and delivering digital media content based on such geo fences. Such methods and systems may be designed for dynamic real time publishing of geo fence events (such as delivery of specific digital media content) across operating systems used on subscription devices (such as smart phones). It allows users of mobile devices to subscribe to dynamic events in which digital media content is updated based on the geographic location of these devices. In an overall process associated with events, the geographic location of a subscription device is determined and compared to one or more geo fences to determine whether the device is inside or outside of these geo fences. The content is identified for sending or otherwise providing to the subscription device based on the device's presence with respect to the geo fence. In other words, one subset of digital media content may be provided to the subscription device when it is determined that the device is within the geo fence and a completely different subset may be provided when this device is outside of that geo fence. This approach allows providing different content to subscription devices dynamically based on their locations, which may be used as a part of marketing campaign, to improve content experience of the user by providing location appropriate content, and for other purposes.

Geo fences can be updated and created in real time by a publisher using a publisher interface. A publisher interface may have a slider-based control to define the radius of geo fences. This control feature is sometimes referred to as a sliding ruler interface. This feature allows the publisher to easily and quickly set up the radius of a geo fence without the monotony of entering and testing integer values. Furthermore, the publisher interface may include a map portion, which illustrates in real time the position, shape, range, and other features of the constructed geo map. The publisher interface also provides mechanisms for managing digital content associated with a geo fence, which may be implemented as a web-based portal. For example, a geo fence publisher can associate a certain subset of digital media content with a specific geo fence or multiple geo fences.

Geo fences may have different shapes, such as circular, rectangular, or irregular shapes. In addition to setting up a geo map by specifying a point and then defining a radius around this point, a geo map may be constructed by specifying corners of the geo map right on the map portion of the publisher interface. The maps may be static (i.e., continuously present in the same location) or movable (i.e., referenced to movable sensors). For example, a delivery vehicle may be equipped with a sensor that identifies real time geographic location of the vehicle. The publisher interface provides mechanisms for defining and publishing the current state of geo fences that may be mobile at any given time. This allows the geo fence publisher to account for geo fences that may change location.

A subscriber side of these methods and systems allows for incorporating geo fence capabilities into subscriber devices. Operating within geo fences is common across different operating system platforms used by subscription devices. In many ways, operating systems of the subscription devices are transparent to publishers. This abstraction reduces complexities during the deployment of geo fences and helps with implementing diverse publishing campaigns regardless of the types of subscription devices. Subscribers or, more specifically, their subscription devices, listen to specific geo fence events based on public tokens assigned by publishers to each subset of digital media content. Each public token may correspond to a different geo fence or app. When a user device enters a geo fence, it receives a subset of digital media content associated with this geo fence or app or, more specifically, the subset associated with a public token assigned to this geo fence or app.

In certain embodiments, methods and systems are configured to optimize the usage of GPS and/or network hardware resources of a subscriber device in order to preserve its battery life while it continues to listen to geo fence events. Instead of using a constant predetermined interval for updating a device's location and transmitting data to and from the subscription device, the intervals are determined dynamically based on various factors. Some examples of these factors include the last location of the device with respect to the nearest geo fence as well as the speed and direction of the device's movement with respect to this geo fence.

Figure 1:
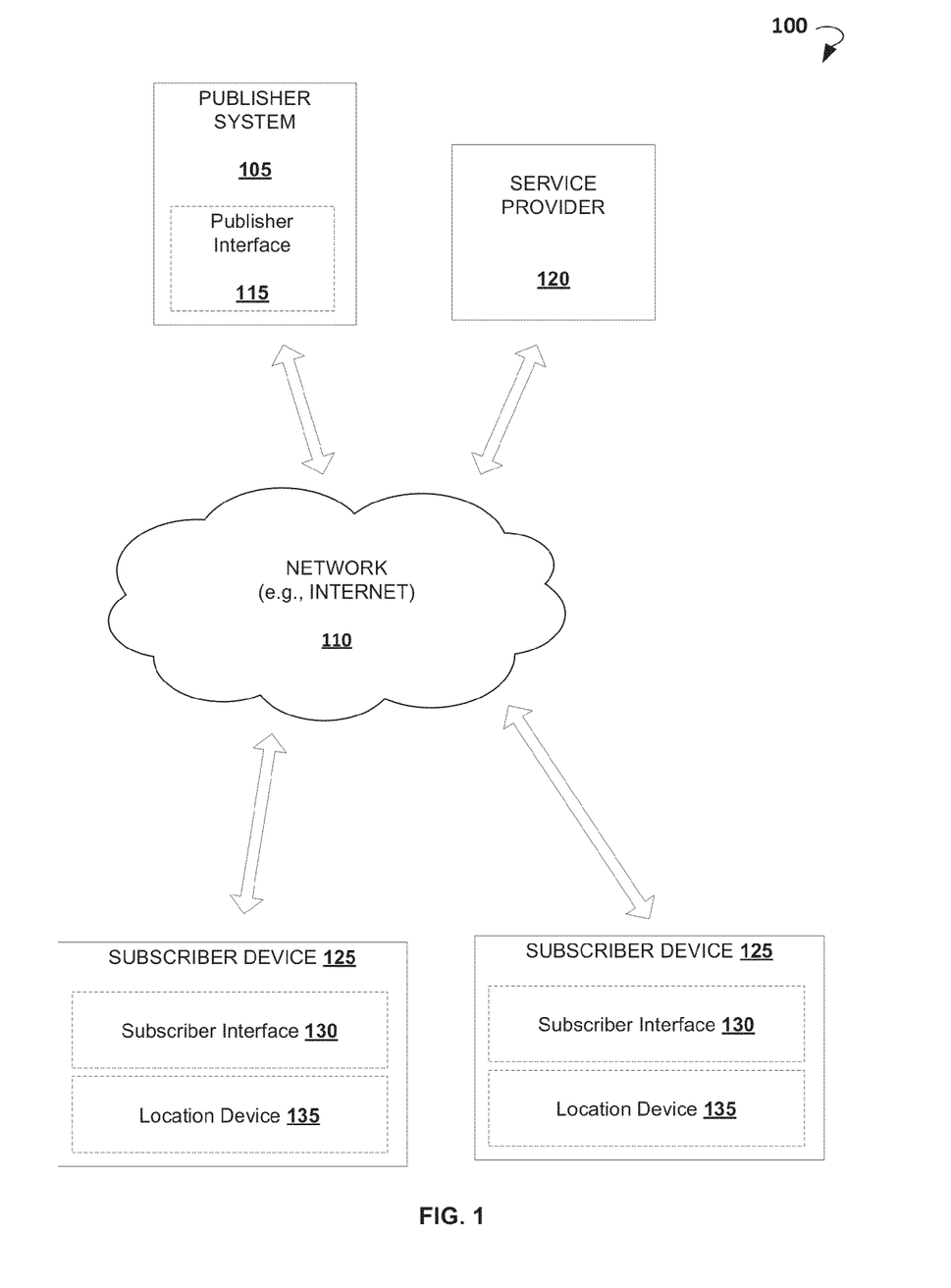
FIG. 1 shows a block diagram illustrating a system environment suitable for setting up geo fences and dynamically delivering particular digital media content based on these geo fences, according to an example embodiment.

Referring now to the drawings, FIG. 1 is a schematic representation of a system environment 100 suitable for setting up geo fences and delivering digital media content based on such geo fences. The system environment 100 comprises one or more subscriber devices 125, a publisher system 105, a service provider 120, and a network 110. The network 110 may couple the aforementioned devices, systems, and modules. The network 110 is a network of data processing nodes interconnected for the purpose of data communication, which may be utilized to communicatively couple various components of the environment 100. The network 110 may include the Internet or any other network capable of communicating data between devices, systems, and modules. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port, such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

As used herein, the term "subscriber device" refers to a computer, a laptop, a tablet computer, a portable computing device, a PDA, a handheld cellular phone, a mobile phone, a smart phone, a cordless telephone, a handheld device having wireless connection capability, or any other electronic device suitable for delivering digital media content to its users. Subscriber devices are geographically mobile. For example, subscriber devices may be handheld devices that can be carried by their users or they may be positioned in a moving vehicle.

Figure 2:
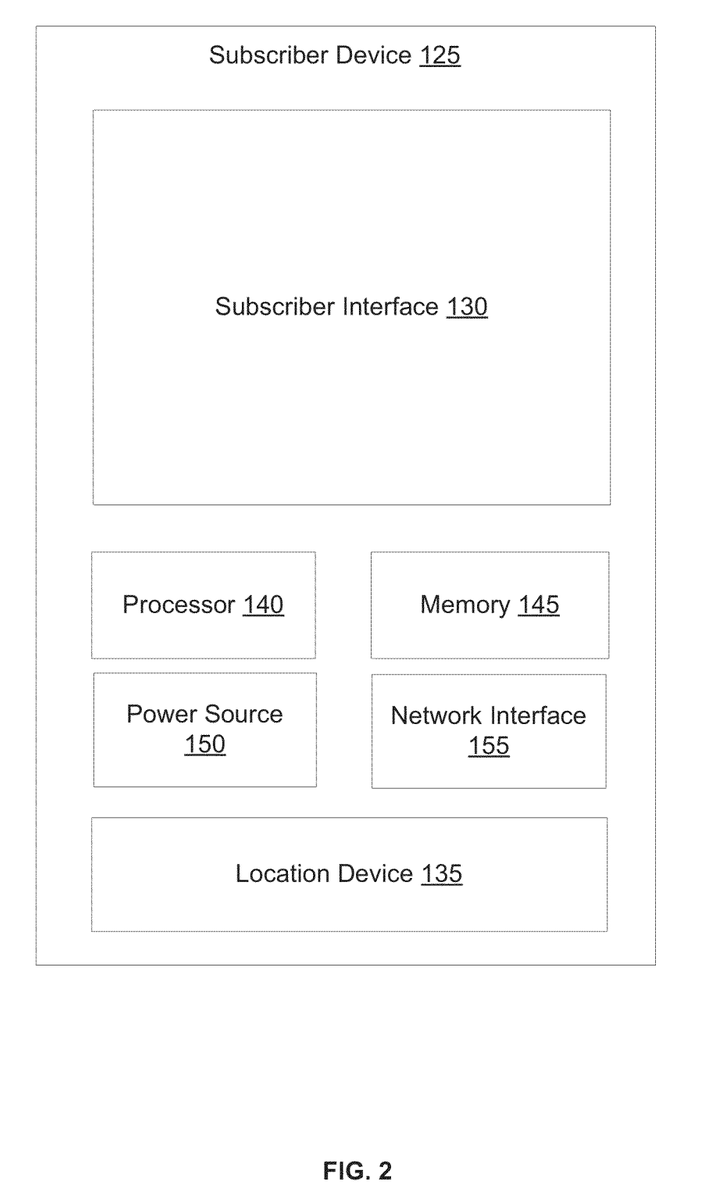
FIG. 2 is a diagram of a subscriber device.

FIG. 2 is schematic representation of subscriber device 125. Subscriber device 125 includes a subscriber interface 130, processor 140, memory 145, location device 135, power source 150, and network interface 155. Subscriber interface 130 is used to deliver media content to its user, which may include a webpage, a digital photo, an image, a text, an audio, and a video. Some examples of subscriber interface 130 include various types of screens, speakers, and other video and audio outputs. Subscriber interface 130 may be also used as an input device, such as a touch screen, for subscribing to publishing services, such as those providing user information, content preferences, and the like. Furthermore, subscriber interface 130 may also be used for completing transactions after viewing the provided digital media content, such as proceeding to a website, adding product items into a virtual shopping cart, and completing a purchase.

Processor 140 may be configured to process a subset of digital media content received from publisher system 105 and for presenting this subset on subscriber interface 130. In certain embodiments, processor 140 is configured to operate in one or more of the following operating systems: IPhone operating system (iOS), Android operating system (e.g., 2.3 Gingerbread, 3.X Honeycomb, Ice Cream Sandwich), Microsoft's Windows Phone, Nokia's Symbian, RIM's BlackBerry OS, and embedded Linux distributions such as Maemo and MeeGo.

Memory 145 may be used to buffer digital media content, store some digital media content for future retrieval, store user preferences associated with various digital media content, store program instructions for executing by processor 140, and other uses. Buffering digital media content in memory 145 may help to improve the quality of content delivery by more frequently updating the content, particularly when subscriber device 125 is moved across boundaries of one or more geo fences at a relatively high speed. As explained above, each geo fence or space outside of these geo fences may be associated with a different subset of digital media content. The content needs to be updated on subscriber device 125 as it moves through the geo fence boundary, which may require the transfer of data to subscriber device 125. In situations when subscriber device 125 moves relatively fast with respect to the boundaries of geo fences, when transfer rates are slow, and/or when significant amounts of data needs to be transferred (i.e., heavy media content, such as video files), the update of the content on subscriber interface 130 may be slow. Specifically, the update may lag behind the actual geographic location of subscriber device 125 and deteriorate the overall experience of having content corresponding to the location. To overcome this problem, a subset of digital media content corresponding to a geo fence may be transferred to subscriber device 125 even before the device enters that geo fence. The decision to transfer this content may be made based on the current location of subscriber device 125 with respect to the geo fence, the travel direction of subscriber device 125 with respect to the geo fence, and the travel speed of subscriber device 125 with respect to the geo fence. Overall, subscriber device 125 and/or publisher system 105 may dynamically determine the probability of subscriber device 125 entering a particular geo fence during a particular time frame and transfer a subset of digital media content to subscriber device 125 based on that probability.

Subscriber device 125 is equipped with a sensor, which is referred herein as location device 135 for determining the current geographical location of the devices. Location device 135 may operate based on, for example, GPS signals, Internet Protocol (IP) addresses, base station information, and so forth. Subscriber device 125 is also equipped with power source 150, such as a battery, for powering other components of subscriber device 125. To preserver the energy of power source 150 (i.e., battery life), subscriber device 125 may be configured to dynamically determine the next cycle for various operations involved in delivering digital media content. These operations are further described below with reference to FIG. 4. There may be no need to update the geographic location of subscriber device 125 if, during the previous cycle, is was determined that the device was far away from the nearest geo fence, that it moved slowly towards this geo fence, or that it moved away from the geo fence. This dynamic algorithm may be referred to as a power up feature and is further described below.

The network interface 155 of subscriber device 125 is one or more devices configured to interact with network 110 and/or other networks. Some examples of network interface 155 include various types of transmitters and receivers, e.g., WiFi cards, 3G/4G cards, and such.

Returning to FIG. 1, system environment 100 also includes publisher system 105 and service provider 120. In certain embodiments, service provider 120 is not present and all back-end functions of the methods described below are performed by publisher system 105. On one end of the spectrum, publisher system 105 may be a computer system with a browser for accessing and using various systems and methods available from service provider 120. In other words, most features and instructions for back end operations are provided by service provider 120. Other divisions of functions between publisher system 105 and service provider 120 are possible. For example, publisher system 105 may include a set of publisher specific instructions used for storing publisher specific geo maps and other features. In the same example, service provider 120 may be used for performing additional features, such as mapping services, which may be common for many different publishers. In a similar manner, digital media content may be stored on publisher system 105, service provider 120, or some other database. The following description refers to publisher system 105. However, one having ordinary skills in the art would understand that some of these features and modules may be implemented at service provider 120 and even at subscriber device 125.

Figure 3:
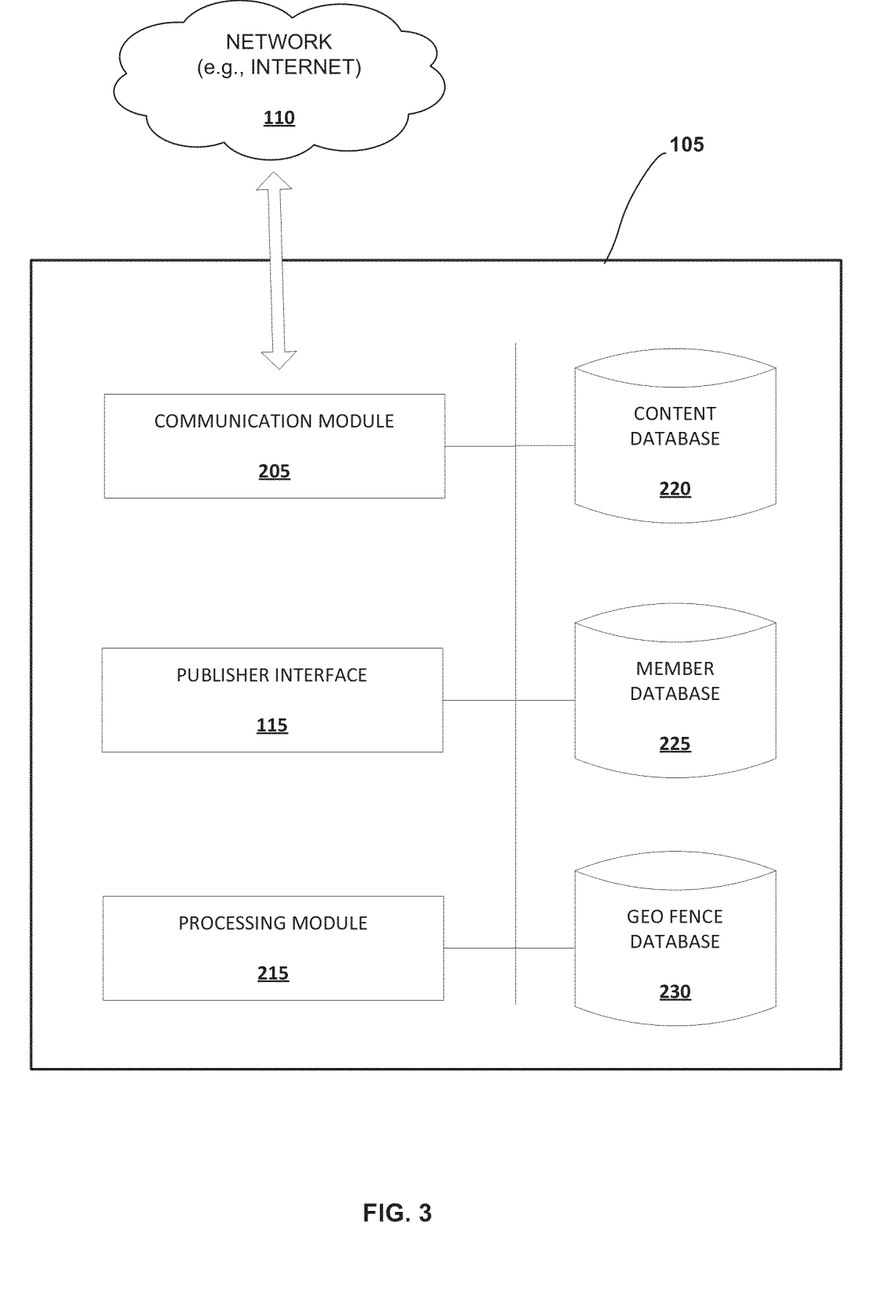
FIG. 3 is a diagram of a publisher system.

FIG. 3 is a schematic representation of publisher system 105. In this embodiment, publisher system 105 may include publisher interface 115, communication module 205, processing module 215, content database 220, member database 225, and geo fence database 230. In other embodiments, publisher system 105 may include additional, fewer, or different modules for various applications. Furthermore, all modules can be integrated within a single system, or, alternatively, can be remotely located and optionally be accessed via a third party.

Publisher system 105 may be implemented as hardware having software installed thereon that implements the steps necessary to operate the publisher system according to example embodiments disclosed herein. Publisher system 105 may include publisher interface 115 used for setting up one or more geo fences and associating digital media content with the one or more geo fences.

According to example embodiments, users of subscriber devices 125 may register with publisher system 105 and create a member profile. The membership details may be stored in member database 225 and may include personal information, such as a name, operating system of the subscriber device, content preferences, typical geographical locations, retail establishment preferences, loyalty program memberships, previous transactions, previous travel patterns, coupons, and such. The subscribers may manage their profiles in member database 225.

The publisher may also upload digital media content for sharing with subscribers to publisher system 105, or more specifically, to content database 220. Some examples of such media content include a webpage, a digital photo, an image, a text, an audio, and a video. The media content may be tagged with public tokens, which the publisher may obtain for each individual geo fence or app. In certain embodiments further described below, multiple geo fences or apps share the same token. The information pertaining geo fences is stored in geo fence database 230.

A publisher may generate one or more geo fences and associate digital media content with these geo fences using publisher interface 115. A few examples of publisher interface 115 during various operations are presented in FIGS. 6-9.

Communication module 205 may be configured to connect publisher system 105 to the one or more subscriber devices 125 and, in certain embodiments, to service provider 120. In particular, communication module 205 may receive updates of the geographic location of subscriber devices 125 to determine whether any one of these devices entered or left one of geo fences identified in geo fence database 230. If such an event occurs, publisher system 105 or, more specifically, its processing module 215, may identify a new subset of digital media content available in content database 220 for sending to identified subscriber devices 125. Communication module 205 may be used for delivering that content.

Figure 4:
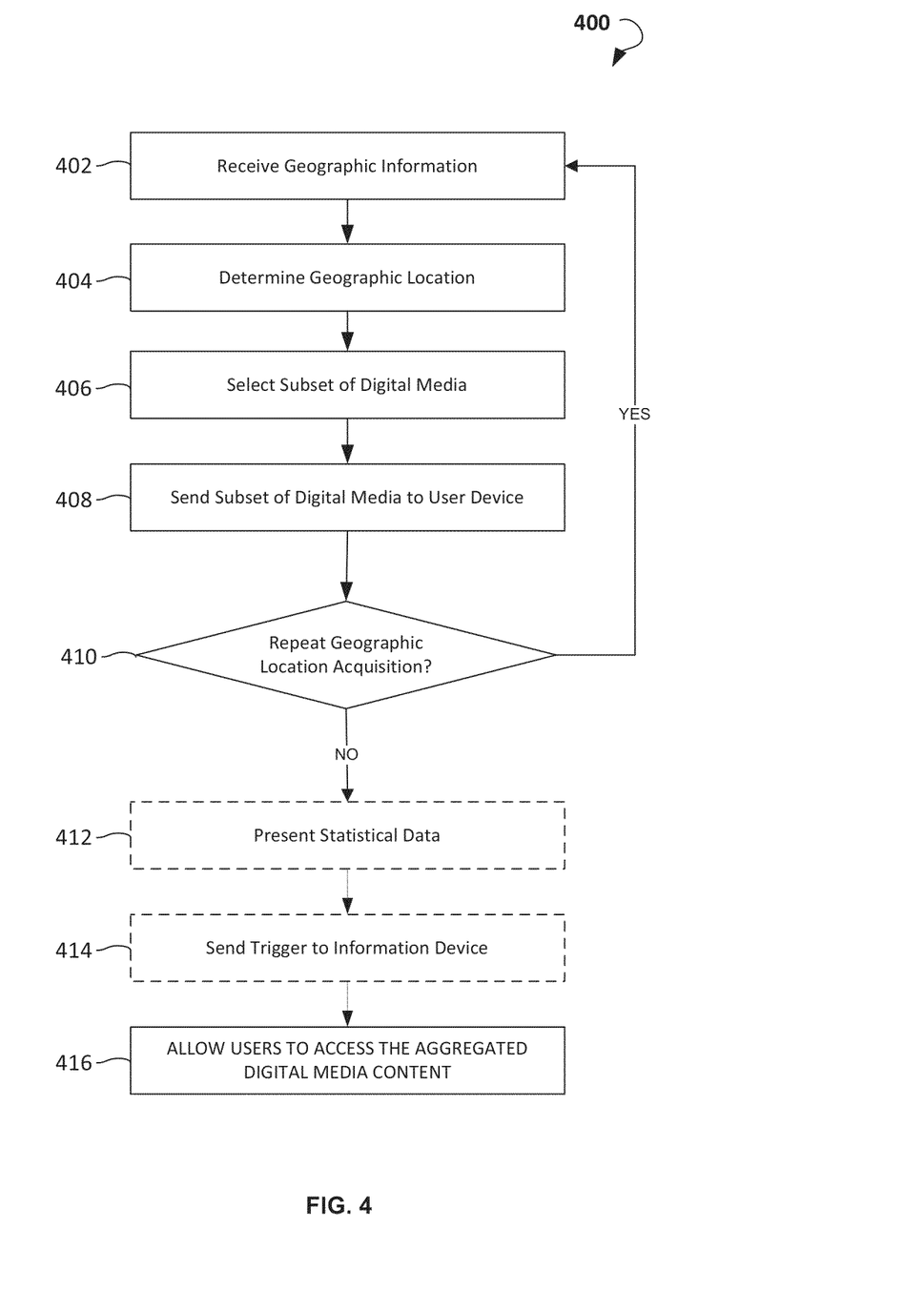
FIG. 4 is a process flow diagram of a method for delivering digital media content to a subscriber device.

FIG. 4 is a process flow diagram showing a method 400 for sharing digital content by a server in a communication network comprising a set of subscriber devices. The method 400 may be performed by processing logic that may comprise hardware (e.g., dedicated logic, programmable logic, and microcode), software (such as software run on a general-purpose computer system or a dedicated machine), or a combination of both. The processing logic may reside at subscriber devices 125, publisher system 105, service provider 120, or various combinations of these components of environment 100.

The method 400 can be performed by the various modules discussed above with reference to FIG. 3. Each of these modules can comprise processing logic. It will be appreciated by one of ordinary skill that examples of the foregoing modules may be virtual, and instructions said to be executed by a module may, in fact, be retrieved and executed by a processor. The foregoing modules may also include memory cards, servers, and/or computer discs. Although various modules may be configured to perform some or all of the various steps described herein, fewer or more modules may be provided and still fall within the scope of example embodiments.

As shown in FIG. 4, the method 400 may commence at operation 402 in which geographic location information is received from a subscriber device. The geographic location information corresponds to the current geographic location of this device. It may be obtained by the device using its GPS device and/or using Wi-Fi networks, mobile networks, and other networks capable of determining location of the device within the network. The device may be set such that it allows applications and websites associated with the method and system used for delivering digital media content to the device to access its location.

At operation 404, geographic location information received during operation 402 is used to compare the current geographic location of the subscriber device with respect to one or more geo fences associated with the digital media content. In other words, it is determined if a subscriber device is located within one or more geo fences. Different arrangements of multiple geo fences will now be briefly described.

A predetermined point may have multiple nested geo fences (i.e., one inner geo fence that is closer to the predetermined point and at least one outer geo fence that is further away from the predetermined point and may include the inner geo fence). When a subscription device is located within the outer geo fence, a different subset of digital media content is selected than when the subscription device is located within the inner geo fences. The content may be organized in such a way as to encourage the user of the subscription device to move towards a predetermined point associated with these geo fences.

However, when multiple geo fences are constructed around the same predetermined point, such geo fences do not need to be nested format. For example, multiple geo fences may be constructed to capture different areas with respect to a predetermined point, such as different streets approaching the intersection where a retail establishment corresponding to the predetermined point is actually located. In certain embodiments, multiple geo fences may partially overlap.

Furthermore, geo fences created around different predetermined points may overlap such that the same geographic location may fall within two geo fences associated with different predetermined points. For example, a street corner may include two vendors that set up their own sets of geo fences. When a user comes to this corner, his location or, more specifically, the geographic location of his or her subscriber device, may fall within these geo fences. The methods and systems described herein may include one or more features to select one of these geo fences based on various factors, such as the relative sizes of these geo fences and relative proximity of the subscriber device to the different predetermined points, ratings of the different predetermined points, the user's preferences identified on the subscriber device, and other factors.

Method 400 may then proceed with operation 406 in which a subset of the digital media content is selected based the current geographic location of the subscriber device with respect to the one or more geo fences. Each geo fence of the same predetermined point may be associated with a different subset of the digital media content. For example, digital media content may be parsed with a specific purpose of directing the user to this or some other predetermined point. One predetermined point may correspond to a store and have two or more nested geo fences (as explained in the example above). When it is determined (i.e., during operation 404) that a subscriber device is located within the outer geo fence, the content selected for sending to the subscriber device may be more compelling for a user to go the store than when the subscriber device is located within the inner geo fence. For example, the user may be offered a higher discount while he or she is within the outer geo fence than when they move within the inner geo fence. To avoid forfeiting this initial discount offer while moving towards the predetermined point (i.e., from the outer geo fence and into the inner geo fence), the user may need to accept this initial offer by interacting with the subscriber interface of the device. In the same example, another geo fence may be set around a competitor's store. When it is determined that a user is within that geo fence (i.e., within the vicinity of the competitor's store), the content prepared for sending to the subscriber device may include an even more powerful stimulus (e.g., a greater discount) than the content associated with the two geo fences corresponding to the original store.

In addition to the current geographic location of the subscriber device with respect to the one or more geo fences, the content selected during operation 406 may be based on the user's preferences and various information about the user available to the service provide, such as user's age, economic status, previous purchases, and previous overlaps with other geo fences.

Method 400 may then proceed with sending the selected subset of the digital media content to the subscriber device for displaying on a subscriber interface of the subscriber device during operation 408. This transmission may occur through various communication networks and protocols described above. In certain embodiments, a portion or entire digital media content may be already available on the subscriber device prior to operation 408.

In certain embodiments, operations 402, 404, 406, and 408 may be repeated as reflected by the decision block 410. The decision to repeat these operations may come from the subscriber device or from the server. For example, a subscriber device may determine that its location has changed substantially from the last time it submitted the geographic information to the server and, as a result, the device may start another series of operations. In other embodiments, the server may ping the device to send geographic information. The decision to repeat operations 402, 404, 406, and 408 may be based on one or more factors, such as current geographic location of the subscriber device with respect to a nearest available geo fence, a speed of changing the current geographic location, and a direction of changing the current geographic location with respect to the nearest available geo fence. One or more of the factors may be a part of the power up algorithm that is designed to conserve the battery power of the subscriber device. In other words, instead of continuously receiving periodic updates of the device's geographic location (e.g., triggered by a timer), the algorithm calculates an optimal time when such updates are necessary. For example, when a device is far away from the nearest geo fence, moves relatively slow, and/or moves in a direction away from the geo fence, the algorithm may set a longer period before the next update of the device's geographic location is triggered. On the other hand, when the device is within or near one or more geo fences, moves rapidly, and/or moves towards these or other geo fences, updates may be triggered more frequently to ensure that the device receives the most accurate subset of the digital media content corresponding to its current location.

When operations 402, 404, 406, and 408 are repeated, it may be determined that the device is now within different geo fences than during the previous cycle. In this case, a different subset of digital media may be selected during operation 406 and sent to the subscriber device during operation 408. As described above, one factor for associating different subsets of digital media with different geo fences is to encourage the user to get to a predetermined point associated with these geo fences. Another option may be to inform users about products and services associated within the geographic area associated with these geo fences. In certain embodiments, even if the geographic location of the subscriber device with respect to the geo fences did not change since the last cycle, a different subset of digital media may be selected during operation 406 and sent to the subscriber device during operation 408 to encourage the user of the subscriber device to move to a different location. For example, a subset of digital media may be selected based on duration of the subscriber device's presence with one or more geo fences. In other embodiments, if the geographic location of the subscriber device with respect to the geo fences did not change since the last cycle, operations 406 and 408 are not invoked, and no new digital media is selected or sent to the user.

In certain embodiments, method 400 may include an analytical component. Specifically, method 400 may involve associating geographic location information obtained from multiple subscriber devices with the one or more geo fences and presenting statistical data numbers corresponding to a number of times these devices enter each of these fences during a predetermined period of time, as reflected by an optional operation 412. A retailer or any other user of geo fencing services may be interested in determining customer traffic through the set geo fences, as well as various other attributes associated with this traffic, such as duration of presence within one or more geo fences and the direction of subscriber devices when entering and leaving geo fences.

In certain embodiments, method 400 involves sending a trigger to an information device positioned in a predetermined location associated with the one or more geo fences during optional operation 414. Some examples of information devices include displays, interactive screens, interactive billboards, and other devices that can be configured to display variable media content. The trigger may be sent based on comparing the current geographic location of the subscriber device to the one or more geo fences. For example, geographic information received during operation 402 may indicate that a user is located near the information device. Instead of, or in addition to, sending the subset of digital media to the subscriber device in operation 408, such information or some complementary information may be sent or otherwise triggered for display on the information device. In certain embodiments, the digital media presented on the information device may include greetings to the user, local maps, and/or some further guiding information, and other similar types of information. In step 416, the user is allowed to access the aggregated digital media content from step 408 and/or step 414.

Figure 5:
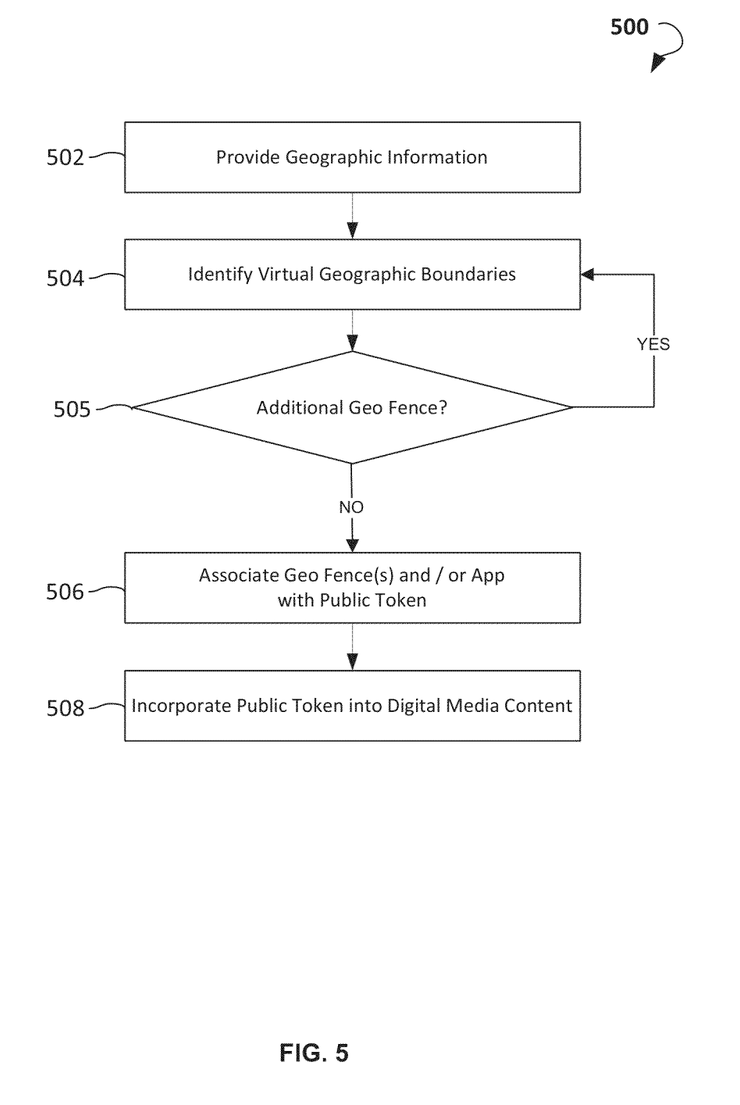
FIG. 5 is a process flow diagram showing a method for setting up one or more geo fences and associating digital media content with these fences.

FIG. 5 is a process flow diagram showing a method 500 for setting up one or more geo fences and associating digital media content with these geo fences. Method 500 may commence with providing geographical information corresponding to a specific geographic location during operation 502. Examples of geographical information include street address, latitude and longitude, and various other formats. The specific geographic location may correspond to a retail location establishment or some other point of interest. The location is sometimes referred to as a predetermined point in other portions of this document.

Figure 6:
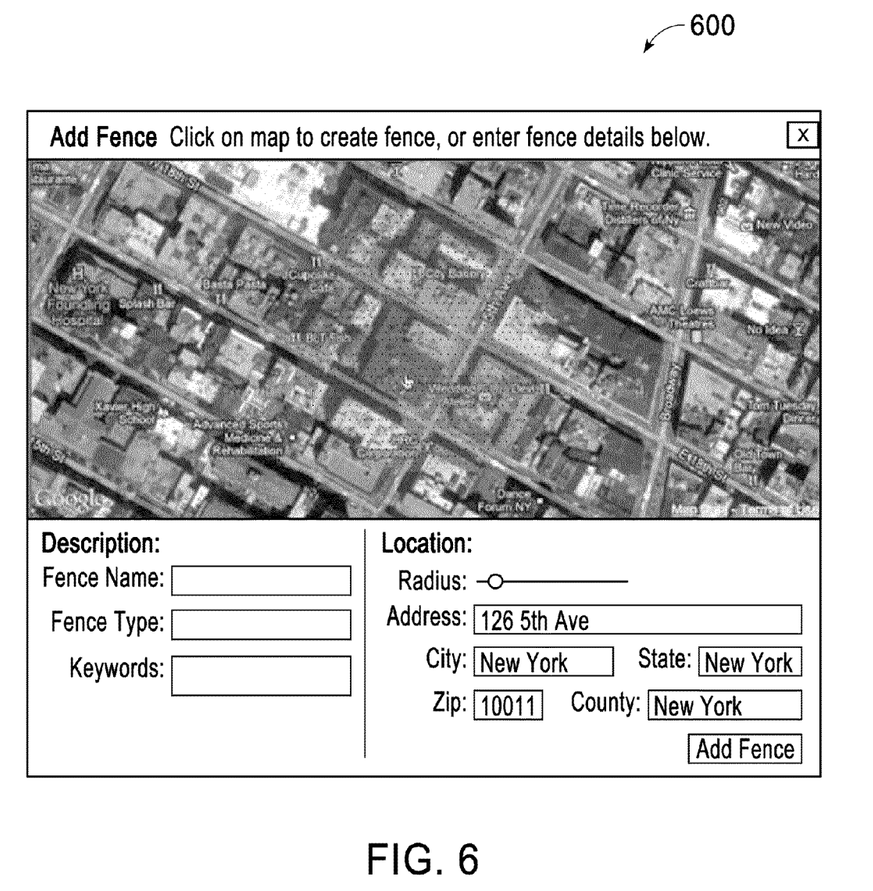

In certain embodiments, this specific geographic location set during operation 502 may be used for identifying a virtual geographical boundary around that location to establish a geo fence during operation 504. For example, a boundary may be defined by a radius around the specified geographic location. In certain embodiments, a publisher interface used for the execution of various operations of this method may include a sliding bar to change the radius of this boundary. One example of such a publisher interface is illustrated in FIG. 6. Specifically, the publisher interface 600 illustrated in FIG. 6 includes a map section, multiple description fields, and location and boundary setting fields. The map section is used to show the specific geographic location entered in the location setting fields on the map. The map section may be built using various existing geospatial services, such as Google Maps. In addition to or instead of the specific geographic location, the map section may be also used to show the boundary of a geo fence. In the specific example of the publisher interface 600 illustrated in FIG. 6, this boundary is shown with a blue circle. Updating location and boundary setting fields may result in dynamic changes to the map section. Thus, a user can easily select appropriate locations and boundaries and immediately view the geo spatial representations of his or her selections. The description fields are used to identify a map and find this map among other maps.

In certain embodiments, a virtual geographic boundary is set around the point by drawing these boundaries on a publisher interface. For example, these boundaries may be drawn by identifying three or more points on the map. The algorithm then forms lines between pairs of these points to define the boundary. In certain embodiments, a boundary does not have any predetermined points corresponding to a particular geographic location. The idea may be to draw users into an area rather than to a specific location.

In certain embodiments, multiple fences may be created around the same geographic location as illustrated by a decision block 505. A publisher interface may be configured to simultaneously create multiple fences around one or more predetermined points. Various examples of multiple maps corresponding to one point are described above. In certain embodiments, a group of maps may have the same general setting and follow the same rules with respect to selecting a subset of digital media content. For example, a user may identify a plurality of similar retail establishments (e.g., different retail shops identified with the same chain). Geographic locations of these retail establishments may be provided in a data file that is uploaded into the system directly through the publisher interface. Then one or more common geo fences are applied to each one of these geographic locations. A user does not need to go through the laborious process of entering geographic locations for each individual retail establishment. For example, when GameStop wants to run a new marketing campaign for a new video game, it does not need to set individual geo fences for all 6,000+ of its retail locations. Instead, it can simultaneously set all common geo fences through a single routine. When multiple common geo fences are created, a marketing campaign may still be applied individually, or in some group fashion, to these geo fences. In the GameStop example, the corporation may choose to run its campaign only in a selected geographic market that involves only a subset of its 6,000+ retail locations.

Figure 7:
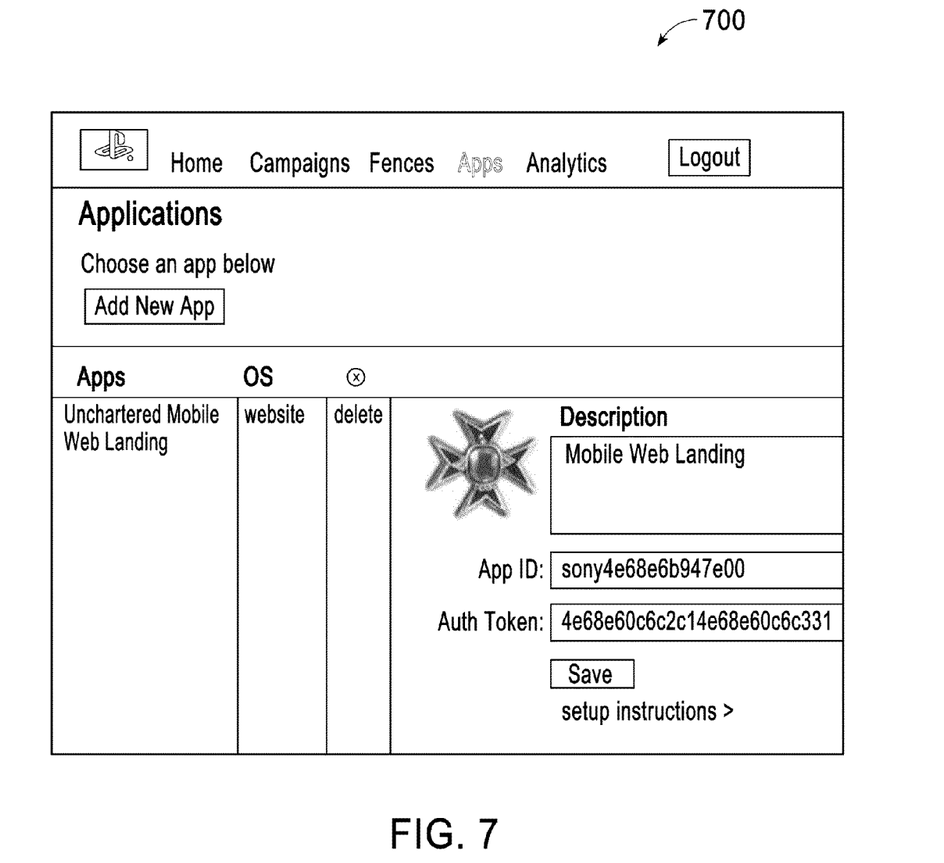

Returning to FIG. 5, method 500 may then proceed with associating one or more geo fences or apps with a public token during operation 506. This token is later associated with a subset of digital media content for subsequent identification and selection of this content. A token is a unique identifier of each geo fence or app that allows for associating the geo fence or app to some media content. In certain embodiments, multiple geo fences and apps may have a shared token. However, this approach does not allow for differentiating media content among these geo fences and apps. In the above GameStop example, geo fences or apps for all or a subset of the retail establishments may share the same public token. Later, when it is determined that a subscriber device is located within one or more specified geo fences, the same media content is provided to the subscriber device. When a more granular approach and a more precise differentiation is needed, each geo fence may have its own individual token. It should be noted that the same media content may be associated with multiple public tokens. On the other hand, each public token is generally associated with only one subset of digital media content. However, in certain embodiments, a public token may correspond to multiple subsets of digital media content. Selection among these subsets may be determined based on additional parameters, such as user defined preferences. FIG. 7 is an example of the publisher interface 700 providing token information, in accordance with certain embodiments.

Returning to FIG. 5, on certain embodiments, method 500 may proceed with incorporating or, more generally, associating the public token into the subset of the digital media content during operation 508. For example, a token may be embedded into a website to associate this website with a particular geo fence. When a subscriber device is located within this geo fence, the website content may be provided to the device and displayed on its publisher interface.

Figure 8:
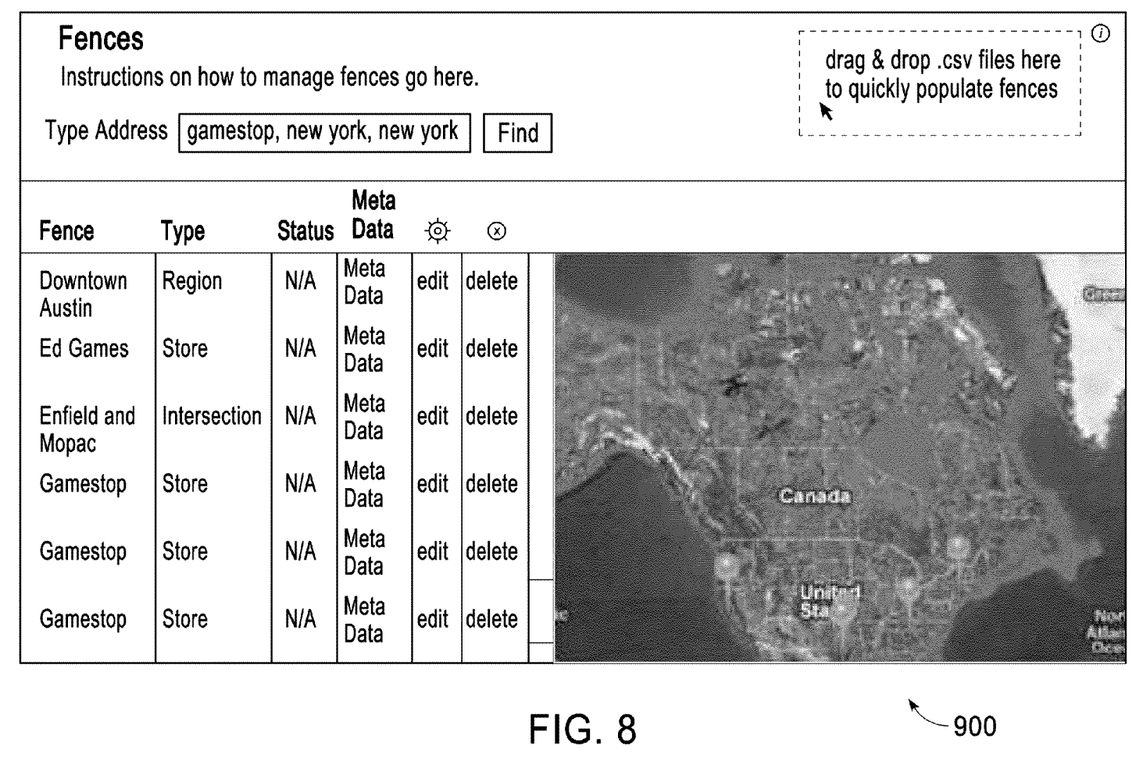

FIGS. 8 and 9 include two additional publisher interface examples that help to understand additional features of method 500. Specifically, FIG. 8 is an example of publisher interface 800 indicating a list of different geo fences that are available for associating with digital media data. This list allows the publisher to perform quick changes to different geo fences and retrieve information pertaining to these geo fences. Publisher interface 800 also includes a map view on the right hand side illustrating positions of these fences on the global map. FIG. 9 is an example of publisher interface 900 corresponding to the main screen. The publisher interface 900 includes overview information about all campaigns, fences, and applications and allows for quick navigation to the other parts of this interface.

Figure 10:
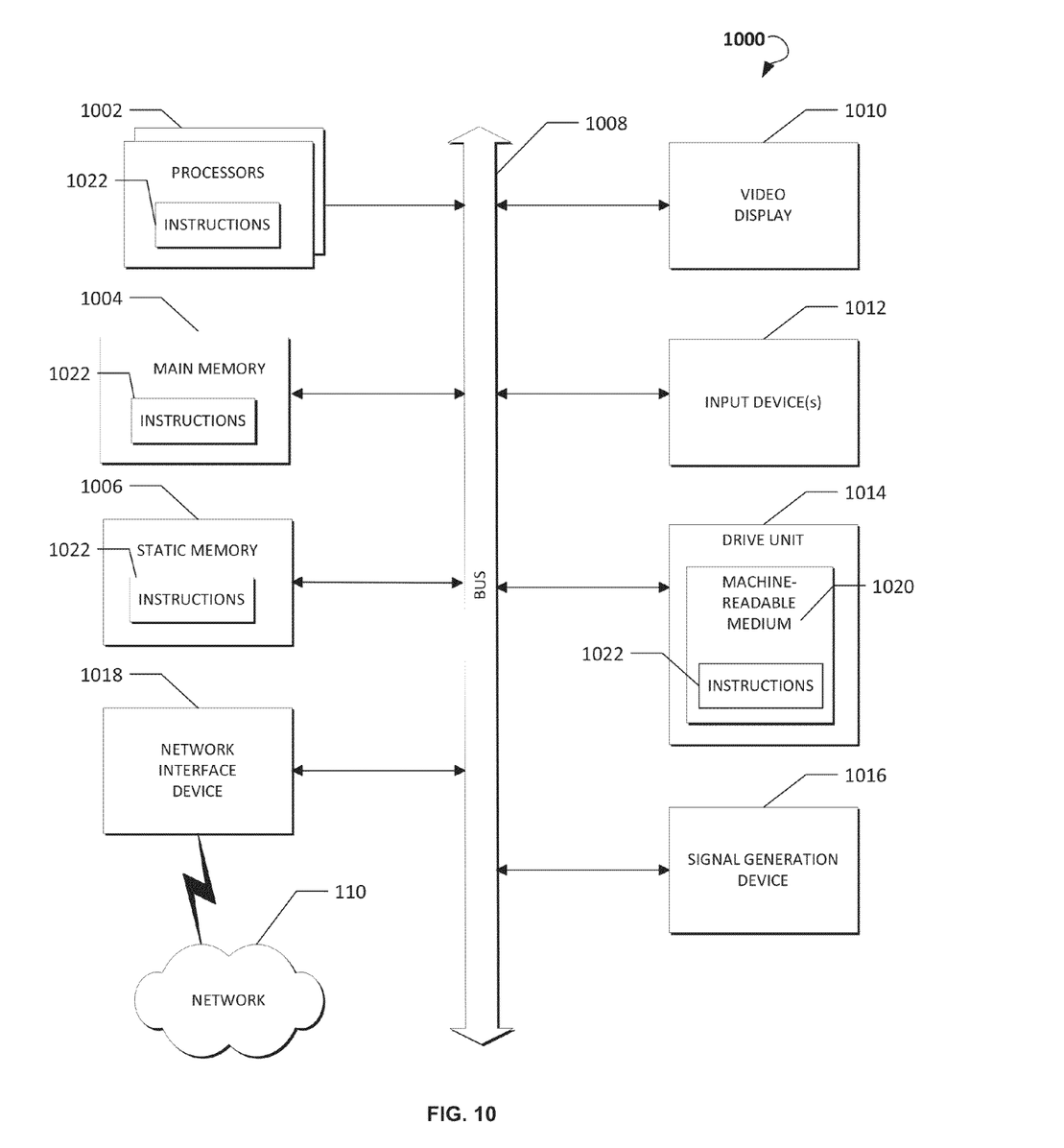
FIG. 10 is a diagrammatic representation of an example machine in the form of a computer system within which a set of instructions, for the machine to perform any one or more of the methodologies discussed herein, is executed.

FIG. 10 shows a diagrammatic representation of a computing device for a machine in the example electronic form of a computer system 1000, within which a set of instructions for causing the machine to perform any one or more of the methodologies discussed herein can be executed. In example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a PDA, a cellular telephone, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1002 (e.g., a central processing unit (CPU), a graphics processing unit (GPU), or both), and a main memory 1004 and a static memory 1006, which communicate with each other via a bus 1008. The computer system 1000 can further include a video display unit 1010 (e.g., a liquid crystal display (LCD) or cathode ray tube (CRT)). The computer system 1000 also includes at least one input device 1012, such as an alphanumeric input device (e.g., a keyboard), a cursor control device (e.g., a mouse), a microphone, a digital camera, a video camera, and so forth. The computer system 1000 also includes a disk drive unit 1014, a signal generation device 1016 (e.g., a speaker), and a network interface device 1018.

The disk drive unit 1014 includes a computer-readable medium 1020 (also called a machine-readable medium 1020) which stores one or more sets of instructions and data structures (e.g., instructions 1022) embodying or utilized by any one or more of the methodologies or functions described herein. The instructions 1022 can also reside, completely or at least partially, within the main memory 1004 and/or within the processors 1002 during execution thereof by the computer system 1000. The main memory 1004 and the processors 1002 also constitute machine-readable media.

The instructions 1022 can further be transmitted or received over the network 110 via the network interface device 1018 utilizing any one of a number of well-known transfer protocols (e.g., Hyper Text Transfer Protocol (HTTP), CAN, Serial, and Modbus).

While the computer-readable medium 1020 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for setting up geo fences and delivering digital media content based on such geo fences have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for delivering variable digital media content associated with one or more geo fences to a subscriber device, the method comprising:
   receiving geographic location information from the subscriber device corresponding to a current geographic location of the subscriber device;
   based on the geographic location information, determining that the subscriber device is located within the one or more geo fences associated with the digital media content from a content publisher, wherein each of the one or more geo fences is associated with a corresponding subset of the digital media content based on a public token assigned to the subset of the digital media content;
   selecting the subset of the digital media content based on the current geographic location of the subscriber device with respect to the one or more geo fences and the public token associated with the one or more geo fences; and
   sending the selected subset of the digital media content to the subscriber device for displaying on a subscriber interface of the subscriber device.

2. The computer-implemented method of claim 1, wherein the digital media content comprises one or more of a webpage, a digital photo, an image, a text, an audio, and a video.

3. The computer-implemented method of claim 1, wherein the subscriber device comprises one or more of a portable computer, a cellular phone, and a personal digital assistant (PDA).

4. The computer-implemented method of claim 1, further comprising:
   receiving new geographic location information from the subscriber device corresponding to a new current geographic location of the subscriber device;
   based on the new geographic location information, determining the new current geographic location of the subscriber device with respect to the one or more geo fences associated with the digital media content;

selecting a new subset of the digital media content based on the new current geographic location of the subscriber device with respect to the one or more geo fences; and sending the new selected subset of the digital media content to the digital media to the subscriber device for displaying on the subscriber interface of the subscriber device.

5. The computer-implemented method of claim 4, wherein the new current geographic location falls within a different geo fence of the one or more geo fences; and wherein the new subset of the digital media content is different from the subset of the digital media content.

6. The computer-implemented method of claim 1, wherein the one or more geo fences are associated with a predetermined location; and wherein the subset of the digital media content is selected to encourage a user of the subscriber device to move towards the predetermined location.

7. The computer-implemented method of claim 1, wherein a predetermined location corresponds to multiple geo fences.

8. The computer-implemented method of claim 1, wherein the one or more geo fences correspond to multiple predetermined locations.

9. The computer-implemented method of claim 1, wherein receiving the geographic location information is repeated based on one or more of the current geographic location of the subscriber device with respect to a nearest available geo fence of the one or more geo fences, a speed of changing the current geographic location, and a direction of changing the current geographic location with respect to the nearest available geo fence.

10. The computer-implemented method of claim 1, wherein the subset of the digital media content is selected based on one or more preference settings associated with the subscriber device.

11. The computer-implemented method of claim 1, wherein the one or more geo fences are mobile and associated with a mobile object.

12. The computer-implemented method of claim 1, further comprising:

collecting geographic location information from multiple subscriber devices over a predetermined period of time;

associating the collected geographic location information from the multiple subscriber devices with the one or more geo fences; and presenting statistical data numbers corresponding to a number of times the multiple subscriber devices enter each one of the one or more geo fences during the predetermined period of time.

13. The computer-implemented method of claim 1, further comprising, based on determining the current geographic location of the subscriber device with respect to the one or more geo fences, sending a trigger to an information device positioned in a predetermined location associated with the one or more geo fences.

14. The computer-implemented method of claim 13, wherein the information device comprises one or more of a display, an interactive billboard, and an interactive sign.

15. The computer-implemented method of claim 1, wherein the one or more geo fences comprise at least two geo fences arranged in a nested format.

16. A system for delivering variable digital media content associated with one or more geo fences to a subscriber device, the system comprising:

at least one subsystem configured to receive geographic location information from the subscriber device corresponding to a current geographic location of the subscriber device;

at least one subsystem configured to determine that the subscriber device is located within one or more geo fences associated with the digital media content from a content publisher, wherein each of the one or more geo fences is associated with a corresponding subset of the digital media content based on a public token assigned to the subset of the digital media content;

at least one subsystem configured to select the subset of the digital media content based on the current geographic location of the subscriber device with respect to the one or more geo fences if the subscriber device is located within the one or more geo fences and the public token associated with the one or more geo fences;

at least one subsystem configured to send the selected subset of the digital media content to the digital media to the subscriber device for displaying on a subscriber interface of the subscriber device; and a memory coupled to the at least one subsystem, the memory comprising computer codes for the at least one subsystem.

17. A non-transitory computer-readable medium having instructions stored thereon, which when executed by one or more computers, cause the one or more computers to:

receive geographic location information from a subscriber device corresponding to a current geographic location of the subscriber device;

based on the geographic location information, determine that the subscriber device is located within one or more geo fences associated with digital media content from a content publisher, wherein each of the one or more geo fences is associated with a corresponding subset of the digital media content based on a public token assigned to the subset of the digital media content;

select the subset of the digital media content based on the current geographic location of the subscriber device with respect to the one or more geo fences, wherein each of the one or more geo fences is associated with the corresponding subset of the digital media content based on the public token assigned to the subset of the digital media content; and send the selected subset of the digital media content to the digital media to the subscriber device for displaying on a subscriber interface of the subscriber device.

* * * * *